United States Patent [19]

Inoue

[11] Patent Number: 6,058,097
[45] Date of Patent: *May 2, 2000

[54] CHANGER-TYPE DISK PLAYBACK DEVICE

[75] Inventor: Yoshihisa Inoue, Tokyo, Japan

[73] Assignee: Nakamichi Corporation, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/965,971

[22] Filed: Nov. 7, 1997

[30] Foreign Application Priority Data

Dec. 27, 1996 [JP] Japan .................................. 8-358125

[51] Int. Cl.$^7$ ........................... G11B 33/02; G11B 17/04; G11B 17/08
[52] U.S. Cl. ......................... 369/192; 369/75.2; 369/77.1
[58] Field of Search ................................ 369/34, 36, 178, 369/191–194, 75.1–77.2

[56] References Cited

U.S. PATENT DOCUMENTS

| | | | |
|---|---|---|---|
| 4,439,850 | 3/1984 | Takahara et al. | 369/77.2 |
| 4,439,852 | 3/1984 | Hughes | 369/77.2 |
| 4,669,076 | 5/1987 | Broom et al. | 369/77.1 |
| 4,701,899 | 10/1987 | D'Alayer De Costemor D'Arc | 369/36 |
| 4,706,237 | 11/1987 | Nakayama | 369/75.1 |
| 4,833,552 | 5/1989 | Agostini et al. | 360/92 |
| 4,862,445 | 8/1989 | Sasaki | 369/75.2 |
| 4,996,680 | 2/1991 | Staar | 369/37 |
| 5,623,381 | 4/1997 | Sawada et al. . | |
| 5,657,184 | 8/1997 | Sawada et al. . | |
| 5,781,523 | 7/1998 | Ozawa et al. | 369/77.1 |

FOREIGN PATENT DOCUMENTS

| | | |
|---|---|---|
| 6-259862 | 9/1994 | European Pat. Off. . |
| 60-243862 | 12/1985 | Japan . |
| 5-325371 | 12/1993 | Japan . |
| 6-223429 | 8/1994 | Japan . |
| 684545 | 12/1994 | Japan . |
| 8167223 | 6/1996 | Japan . |
| 8241552 | 9/1996 | Japan . |

*Primary Examiner*—William Klimowicz
*Attorney, Agent, or Firm*—Morrison Law Firm

[57] ABSTRACT

A disk transfer mechanism in a disk player is sloped upward toward the front of the disk player to align a disk transfer plane passing approximately through the center of a disk insertion opening. The slope of the disk transfer plane avoids interference between the disk playback mechanism and electronic components in the vicinity of the front or rear of the disk player. In addition, the slope of the disk transfer plane improves the clearances of a stocker, and thereby enables storage and playback of a maximum number of disks within a predetermined envelope.

14 Claims, 10 Drawing Sheets

CHANGER-TYPE DISK PLAYBACK DEVICE

BACKGROUND OF THE INVENTION

The present invention relates to a changer-type disk playback device capable of selectively playing back a plurality of disks stored in a stocker.

In Japanese patent application 7-72281 (Japanese laid-open publication number 8-241552), the present applicant proposed on internally mounted changer-type disk playback device having outer dimensions that conform to the 5¼ inch half-height form factor and that is capable of being attached to the main unit of a computer.

Figure 7:
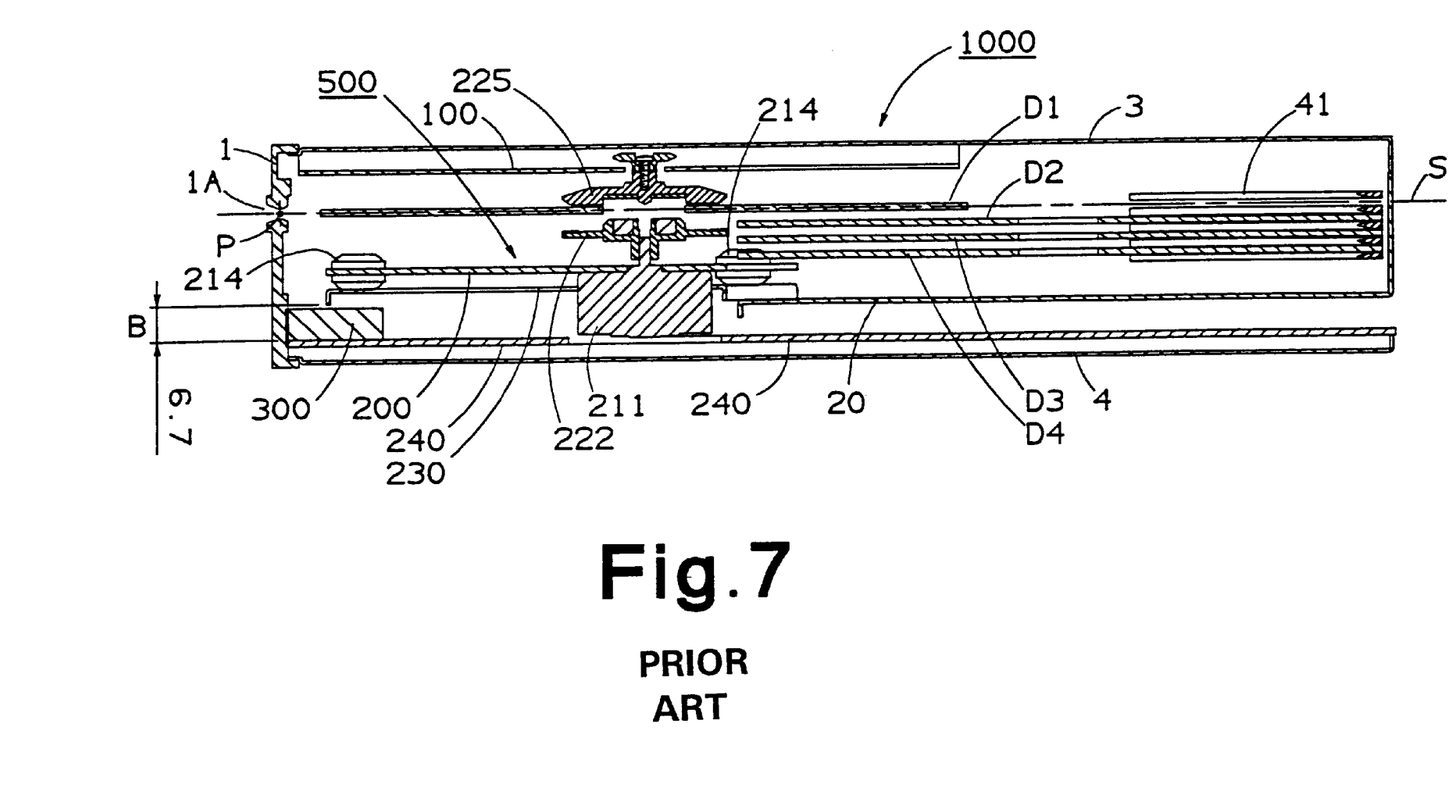
FIG. 7 is a cross-section drawing of a conventional changer-type disk playback device 1000 when disk D1 is brought to playback position P3.
Figure 8:
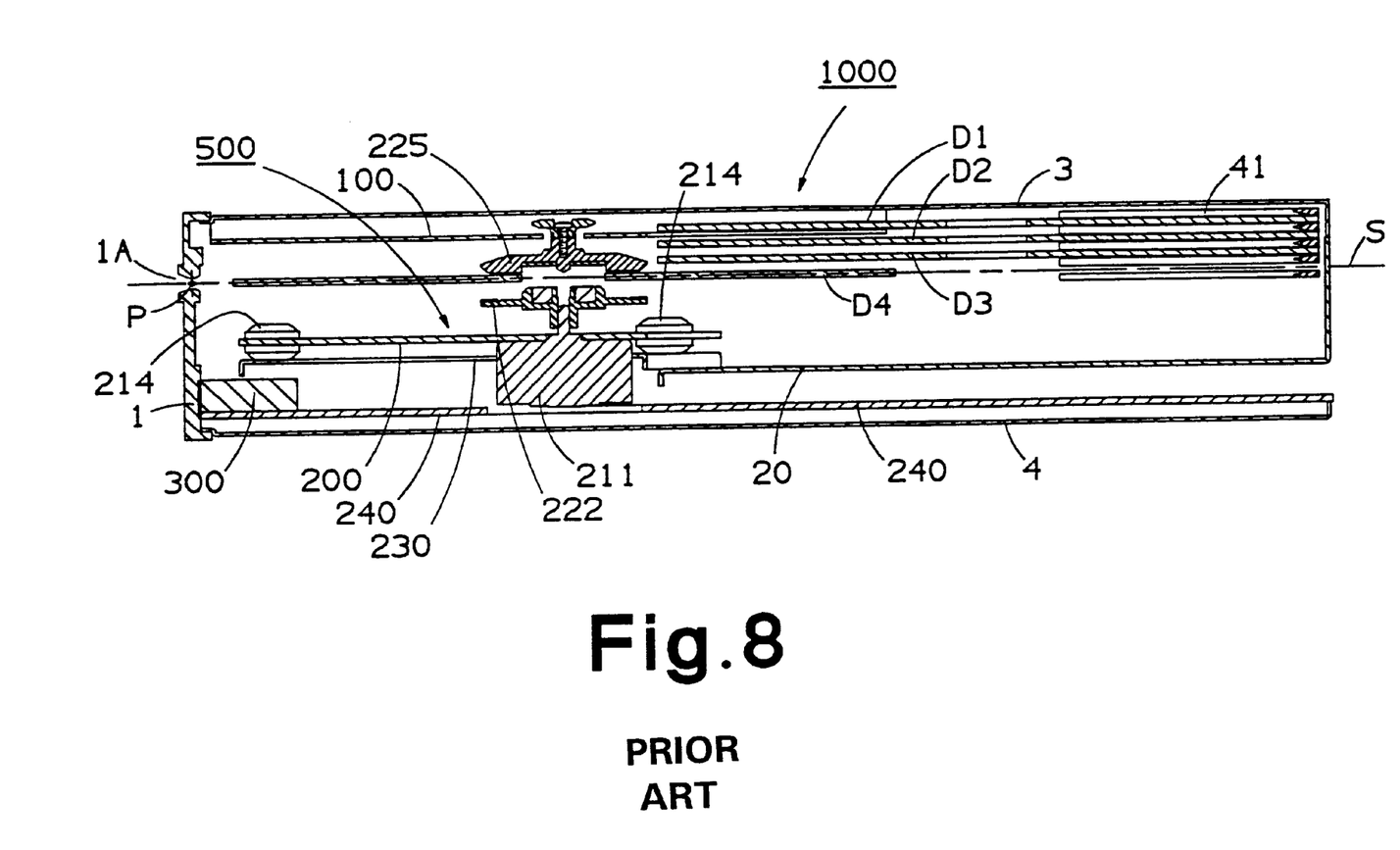
FIG. 8 is a cross-section drawing of a conventional changer-type disk playback device 1000 when disk D4 is brought to playback position P3.

Referring to FIG. 7 and FIG. 8, a stocker 41 capable of holding four disks in the rear of the device is disposed so that it can move up and down. A disk is inserted through a disk insertion opening 1A and played back. By storing disks in stocker 41, the device can selectively play back the disks held in stocker 41.

Of course, there is a desire for an internally mounted changer-type disk playback device that can hold an increased number of disks within the half-height form factor. A number of attempts to do this have been made, but for each additional stored disk, the vertical displacement range of stocker 41 must increase by an amount corresponding to the disk pitch distance (3 mm).

In FIG. 7, stocker 41 is moved down as far as it can go. The downward movement is limited by the size of the casing.

Referring to FIG. 8, stocker 41 cannot be moved further upward in the device.

Figure 9:
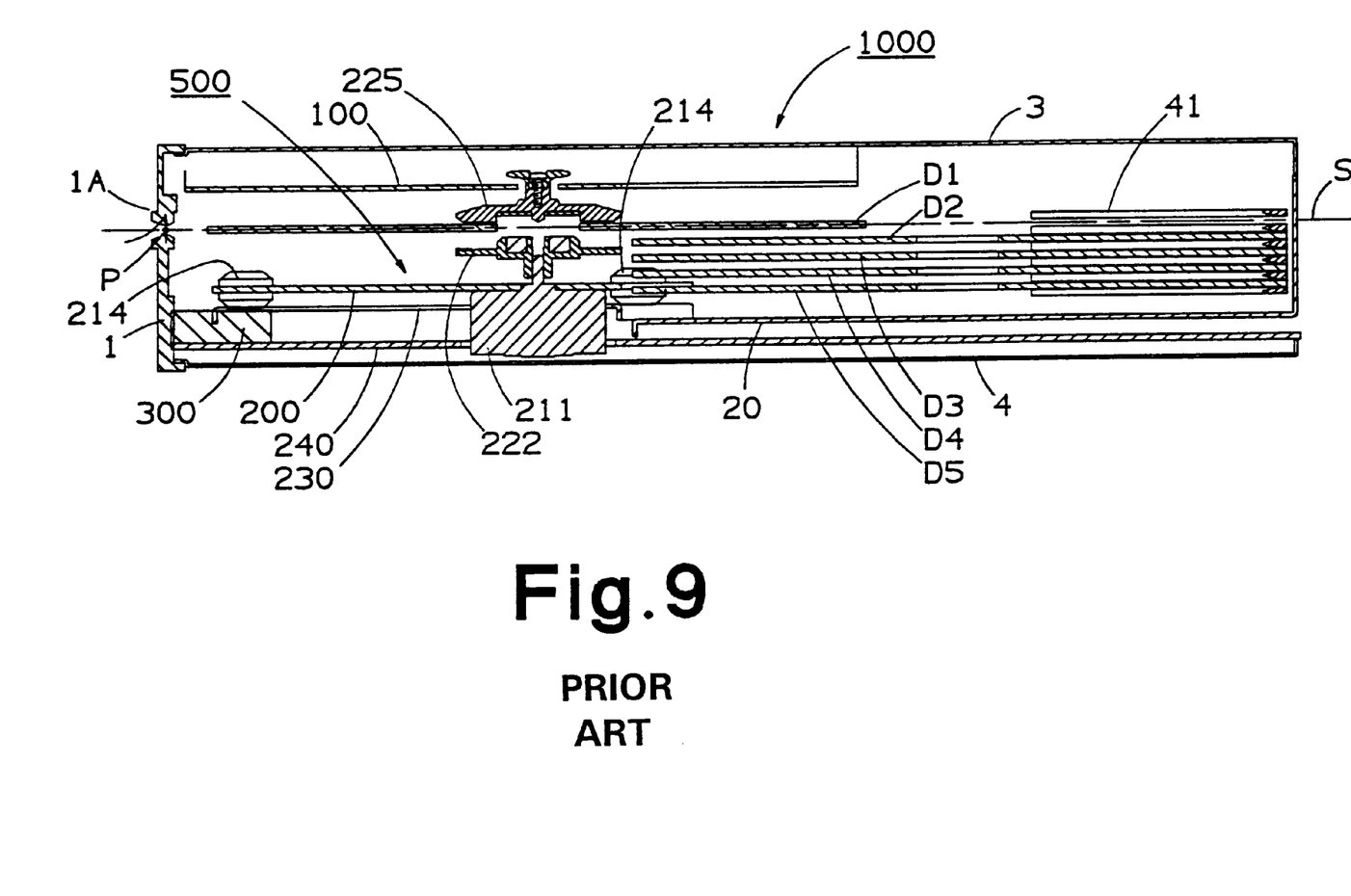
FIG. 9 is a cross-section drawing illustrating the problem that occurs when the number of disks stored in a conventional changer-type disk playback device 1000 is increased.

Referring to FIG. 9, a disk transfer plane S could be moved down by a distance corresponding to the disk pitch distance, i.e., 3 mm, thus increasing the displacement range of stocker 41 downward by 6 mm.

However, when disk transfer plane S is lowered by 3 mm, a disk playback mechanism 500 must also be lowered by the same distance. This results in a narrowing of the gap between disk playback mechanism 500 and a printed circuit board 240, which is attached to the bottom surface of the device. This creates new problems, with disk playback mechanism 500 getting in the way of electronic parts 300, which are relatively elevated (approximately 6 mm) and are attached to printed circuit board 240 near the back surface of a device front panel 1. Electronic parts 300 can include a disk eject switch, a headphone terminal, a headphone volume control, and the like.

Figure 10:
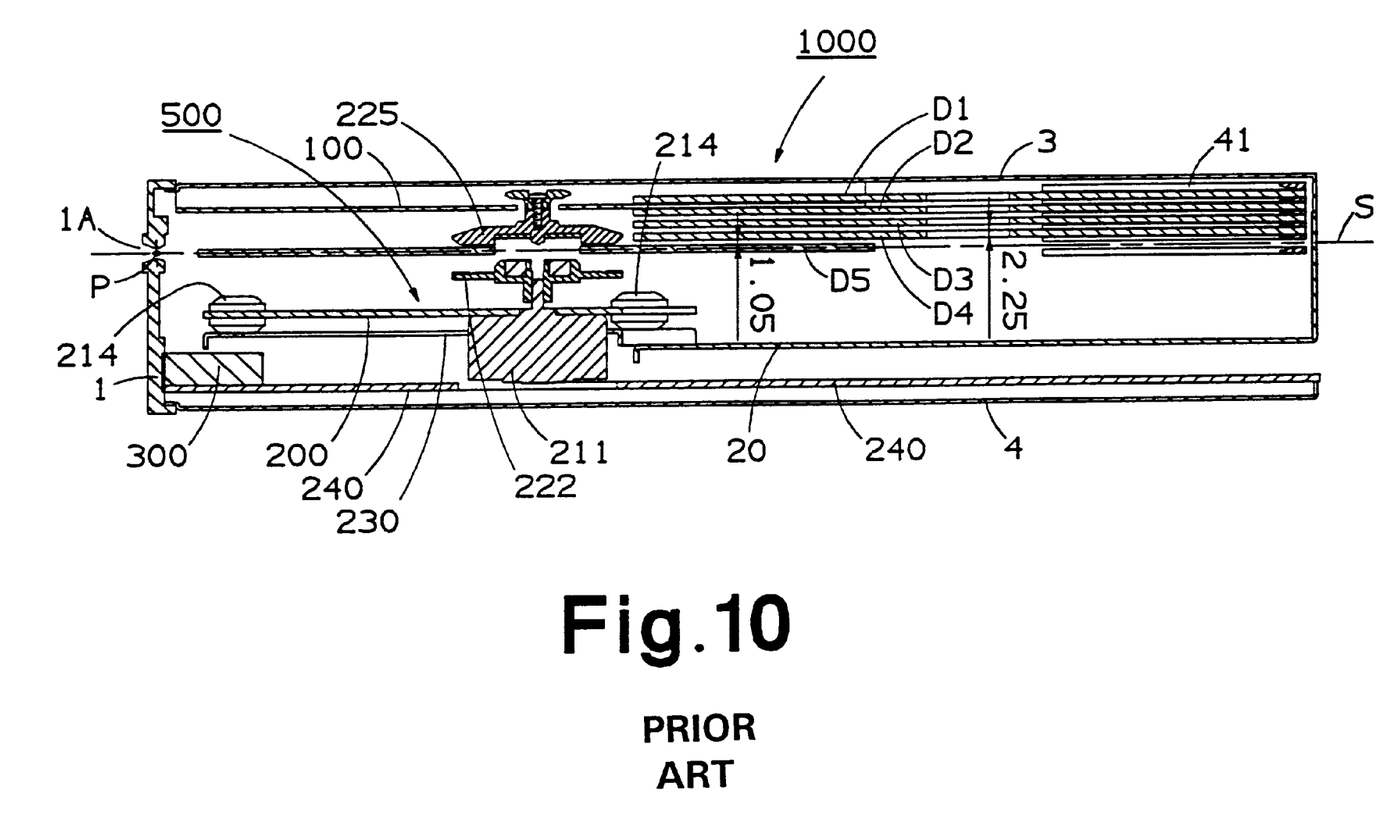
FIG. 10 is a cross-section drawing showing other problems that occur when the number of disks stored in a conventional changer-type disk playback device 1000 is increased.

Referring to FIG. 10, it would also be possible to decrease the disk pitch from 3 mm to 2.25 mm in order to avoid increasing the displacement stroke range of stocker 41 while accommodating additional disks. However, this would result in the gap between adjacent disks held in the stocker being decreased from 1.8 mm to 1.05 mm. If disks are loose within the stocker, the front side of a stocker disk may slope downward, resulting in contact between a playback disk D5 at a playback position and a disk D4 held in the stocker at a position above playback disk D5. This could cause damage to the disks.

OBJECT AND SUMMARY OF THE INVENTION

It is an object of the present invention to provide a disk player which overcomes the drawbacks and limitations of the prior art.

It is another object of the present invention to provide a changer-type disk playback device that can hold a plurality of disks in a storage area.

It is a further object of the present invention to provide a method of transporting a disk from a storage area to a playback position.

It is a still further object of the present invention to provide a changer-type disk playback device that prevents contact between the disks in a storage area and a disk in a playback position.

The above and other objectives of the present invention are realized by a changer-type disk playback device comprising: a front panel having a disk insertion opening; a disk playback mechanism disposed toward the front of the device for playing back disks; a stocker disposed toward the rear of the device capable of holding a plurality of disks coaxially; a disk transfer mechanism having a disk transfer plane with a slope extending from the midpoint of the disk insertion opening towards the stocker, and that transfers a disk inserted from the disk insertion opening to a playback position for mounting the disk to the disk playback mechanism or a storing position for storing the disk in the stocker; and a stocker vertical movement mechanism for vertically moving the stocker relative to the disk transfer plane.

Briefly stated, the present invention provides a disk transfer mechanism in a disk player that is sloped upward toward the front of the disk player to align a disk transfer plane passing approximately through the center of a disk insertion opening. The slope of the disk transfer plane avoids interference between the disk playback mechanism and electronic components in the vicinity of the front of the disk player. In addition, the slope of the disk transfer plane improves the clearances of a stocker, and thereby to enable storage and playback of a maximum number of disks within a predetermined envelope.

According to an embodiment of the invention, there is provided, a disk playback device comprising: a chassis having a front portion and a rear portion, a disk playback mechanism, a disk holder, a disk transfer mechanism, and a vertical movement mechanism, the disk playback mechanism is disposed toward either the front portion or the rear portion of the chassis, the disk holder is disposed toward the other of the front portion and the rear portion of the chassis, the disk transfer mechanism includes a disk transfer plane, the vertical movement mechanism is coupled to the disk holder for moving the disk holder in a direction perpendicular to the disk transfer plane, and the disk transfer plane has a slope from the front portion of the chassis to the rear portion of the chassis for moving a disk from the disk playback mechanism to the disk holder, whereby additional space is available for disks stored in the disk holder.

According to a feature of the invention, there is provided a changer-type disk playback device comprising: a disk insertion opening in the disk playback device, a stocker disposed in the device capable of coaxially storing at least one disk, a disk transfer mechanism with a disk transfer plane having a slope extending from a midpoint of the disk insertion opening toward the stocker, and a stocker vertical movement mechanism selectively moveable in a direction perpendicular to the disk transfer plane, for aligning a disk storage position in the stocker with the disk transfer plane, whereby the disk transfer mechanism is capable of moving a disk inserted into the disk insertion opening to the disk storage position for storing the disk, the slope enabling storage of at least one additional disk in the stocker.

According to a further feature of the invention, there is provided a method of transferring a disk the steps comprising: loading a disk into a disk playback device, moving the disk storage location into engagement with a sloped disk transfer plane between the playback device and the disk storage area, and urging the disk from the playback device to the disk storage location.

In the present invention as described above, the disk transfer plane of the disk transfer mechanism has a slope that is approximately centered on the midpoint of the height of the disk insertion opening. The disk transfer mechanism transfers a disk inserted from the disk insertion opening either to a playback position, where the disk is mounted on the disk playback mechanism, or to a storing position, where the disk is stored in the stocker.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

The present invention stores five disks. The disk transfer plane has a slope approximately centered on the midpoint of the disk insertion opening in order to allow as much space as possible below the disk transfer mechanism. Referring to FIG. 1 through FIG. 6, the following is a description of an embodiment of the present invention. The mechanisms of this device are similar to the corresponding mechanisms described in Japanese laid-open publication 8-241552, the disclosure of which is herein incorporated by reference, and which should be referred to for details of these mechanisms.

A device front panel 1 includes a disk insertion opening 1A. Disk insertion opening 1A is positioned at the same height as in the conventional device holding four disks (FIG. 7, FIG. 8). A disk transfer mechanism 600 transfers a disk inserted through disk insertion opening 1A to a playback position P3, where the disk is mounted to a disk playback mechanism 500 to be described later, or to a storing position P4, where the disk is stored in a stocker 41 to be described later. In this embodiment, disk transfer mechanism 600 includes a drive belt 107 and a friction belt 142 which transfers disks by driving the side surfaces of the disk. L-shaped loading plates 104, 140 comprise guide surfaces (not shown in the drawings) disposed on their lower surfaces for guiding the left and right edges of disks in the disk transfer direction. L-shaped loading plates 104, 140 are attached to the lower surface of a loading chassis 100 so that they can be moved left and right. Loading chassis 100 is sloped at 1.5 degrees (1 degree, 30 minutes) relative to a horizontal plane H of the device. Correspondingly, a disk transfer plane S is sloped toward the bottom surface of the device at the same angle relative to horizontal plane H. The slope extends from a midpoint P of the disk insertion opening 1A towards the stocker 41. A drive belt 107 is disposed between a pulley 106 and a pulley 108 attached to loading plate 104. Drive belt 107 drives the left side surface of a disk inserted in the guide section of loading plate 104. A friction belt 142 is fixed to the guide section of loading plate 140 to prevent the right side surface of the disk from slipping against the guide section when the disk is being transferred Loading plates 104 and 140 are connected via a pinion gear 143 attached to loading chassis 100. Loading plates 104 and 140 are urged toward each other by a spring 160.

Figure 6:
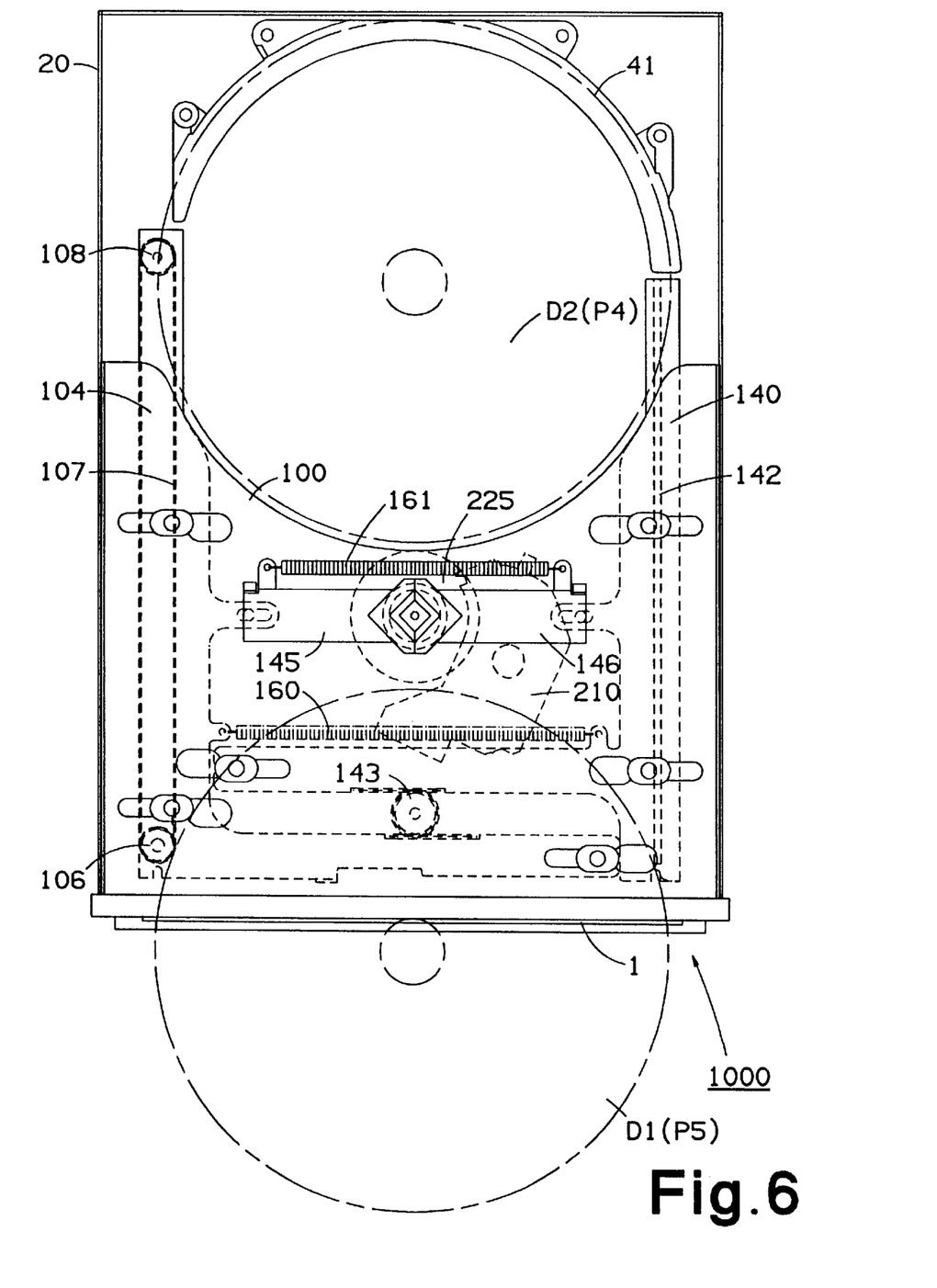
FIG. 6 is a top-view drawing of changer-type disk playback device 1000 according to the present invention when disk D1 is brought to the eject position.

Referring to FIG. 6, with no disk present on disk transfer plane S, loading plates 104 and 140 are positioned so that belt 107 and belt 142 are spaced apart at a disk receiving position (with a belt interval of 112 mm), which is narrower than the disk diameter (120 mm). When a disk is inserted into disk insertion opening 1A, spring 160 stretches to permit loading plates 104 and 140 to move outward to allow the inserted disk to be supported on either side by belts 107 and 142. The counterclockwise rotation of drive belt 107 causes the disk to spin clockwise while being transferred toward the rear of the device.

Figure 4:
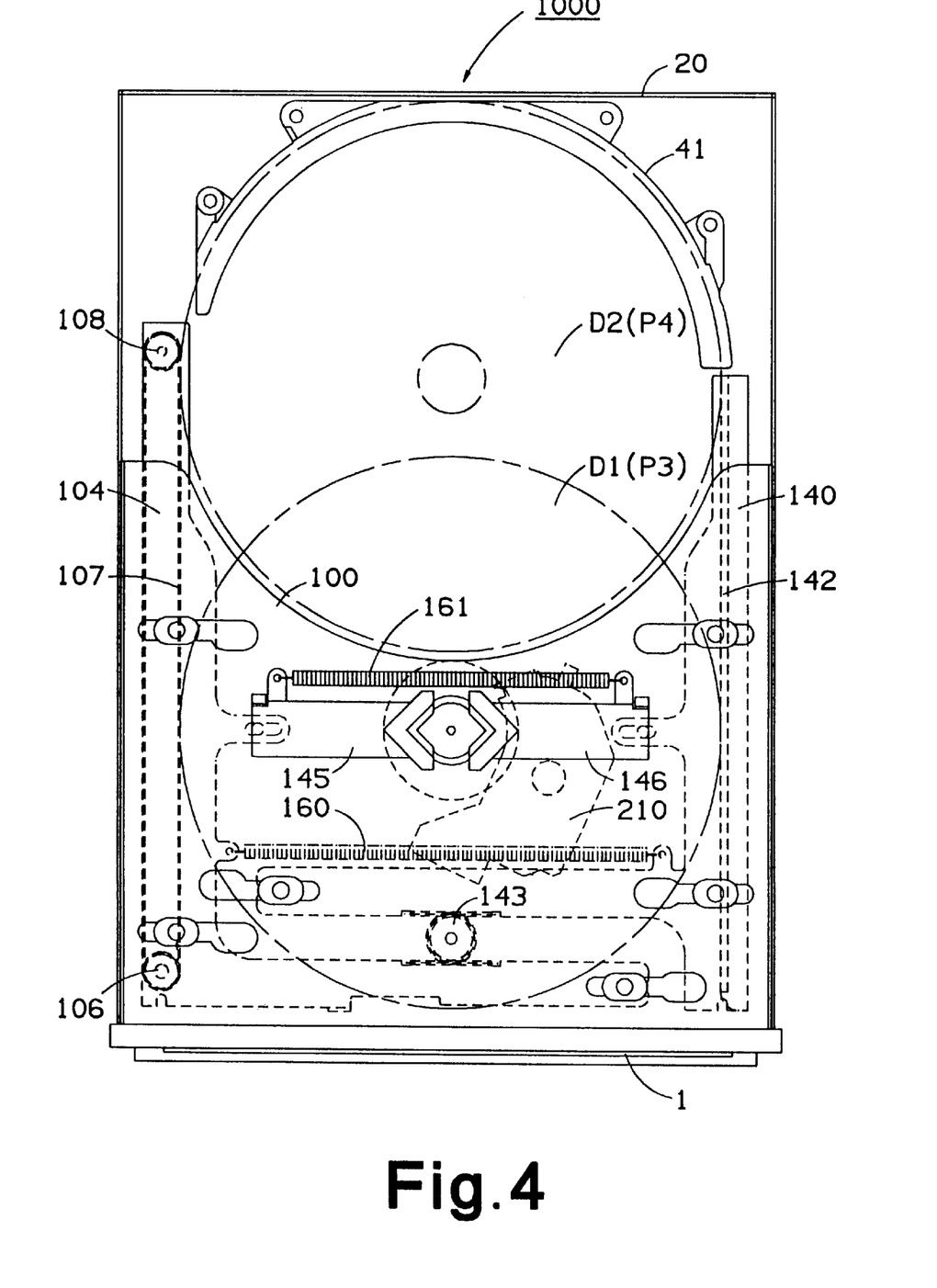
FIG. 4 is a top-view drawing of changer-type disk playback device 1000 according to the present invention when disk D1 is brought to playback position P3.

Referring to FIG. 4, the disk is transferred either to a playback position P3, where it is mounted on a turntable 222, or to a storing position P4, where it is stored in stocker 41 disposed toward the rear of the device. Also, when drive belt 107 is rotated clockwise, the disk is rotated counterclockwise to transfer it toward the front of the device. The disk is transferred either from storing position P4 to playback position P3, or from playback position P3 to an eject position P5, where the disk projects from disk insertion opening 1A (FIG. 6).

Figure 1:
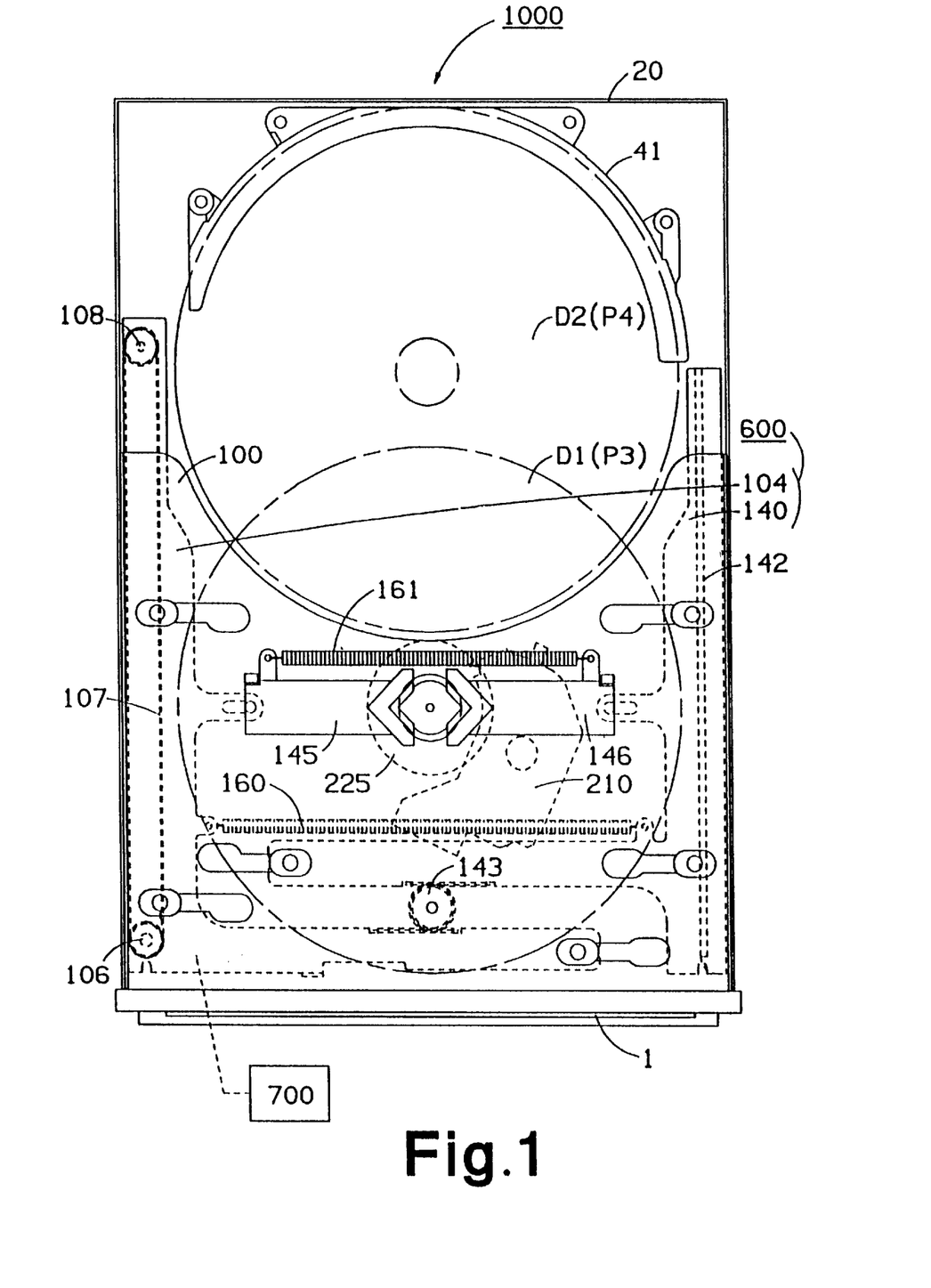
FIG. 1 is a top-view drawing of changer-type disk playback device 1000 according to the present invention while it is playing back disk D1.

Referring to FIG. 1, when belts 107 and 142 are not actively transferring a disk and not awaiting disk insertion, a loading plate opening/closing mechanism 700 moves belts 107 and 142 to an open position away from the side surfaces of the disk. This prevents loading plates 104 and 140 from obstructing disk rotation and vertical movement of stocker 41.

Figure 2:
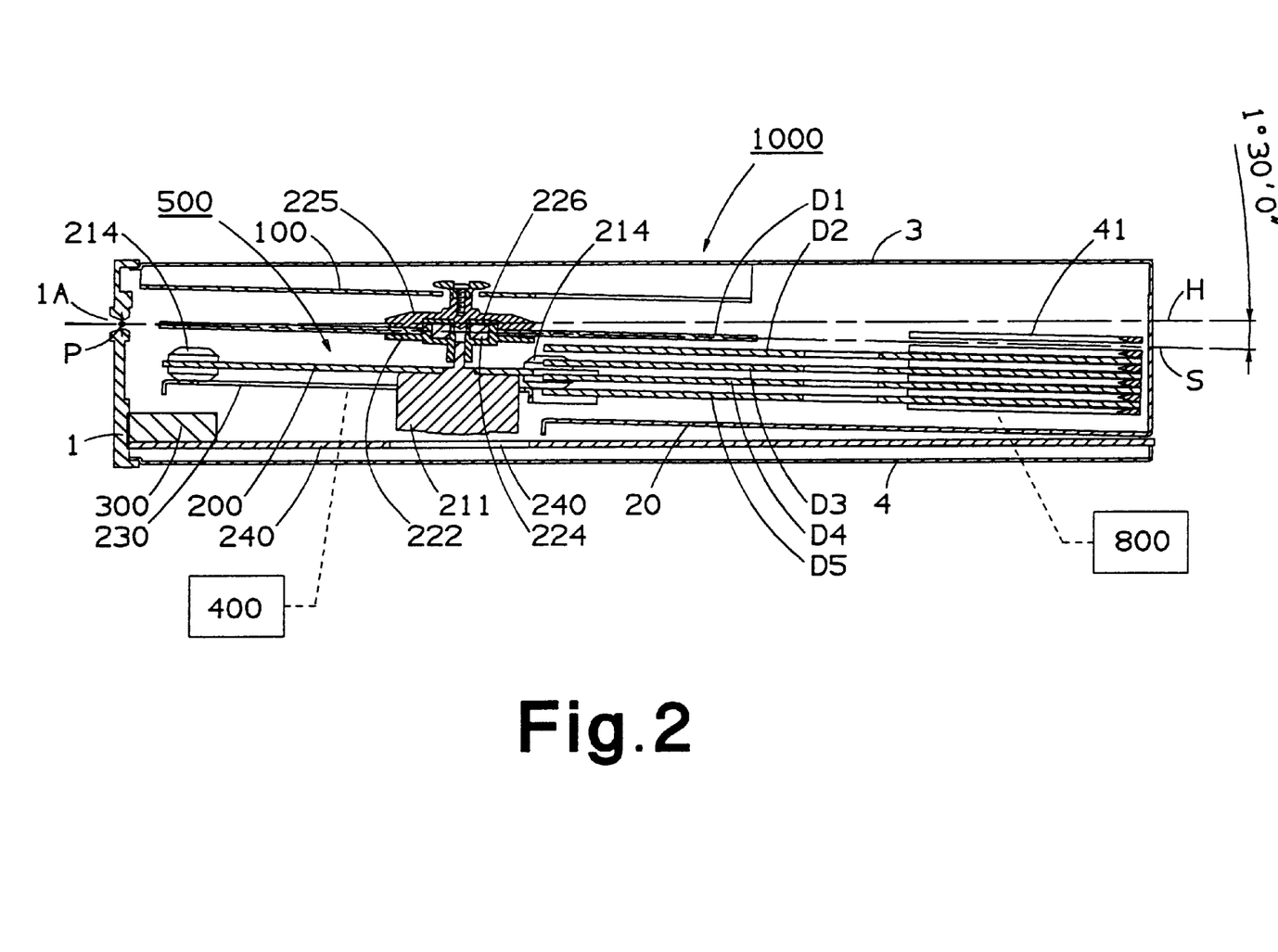
FIG. 2 is a cross-section drawing of changer-type disk playback device 1000 according to the present invention when it is playing back disk D1.
Figure 5:
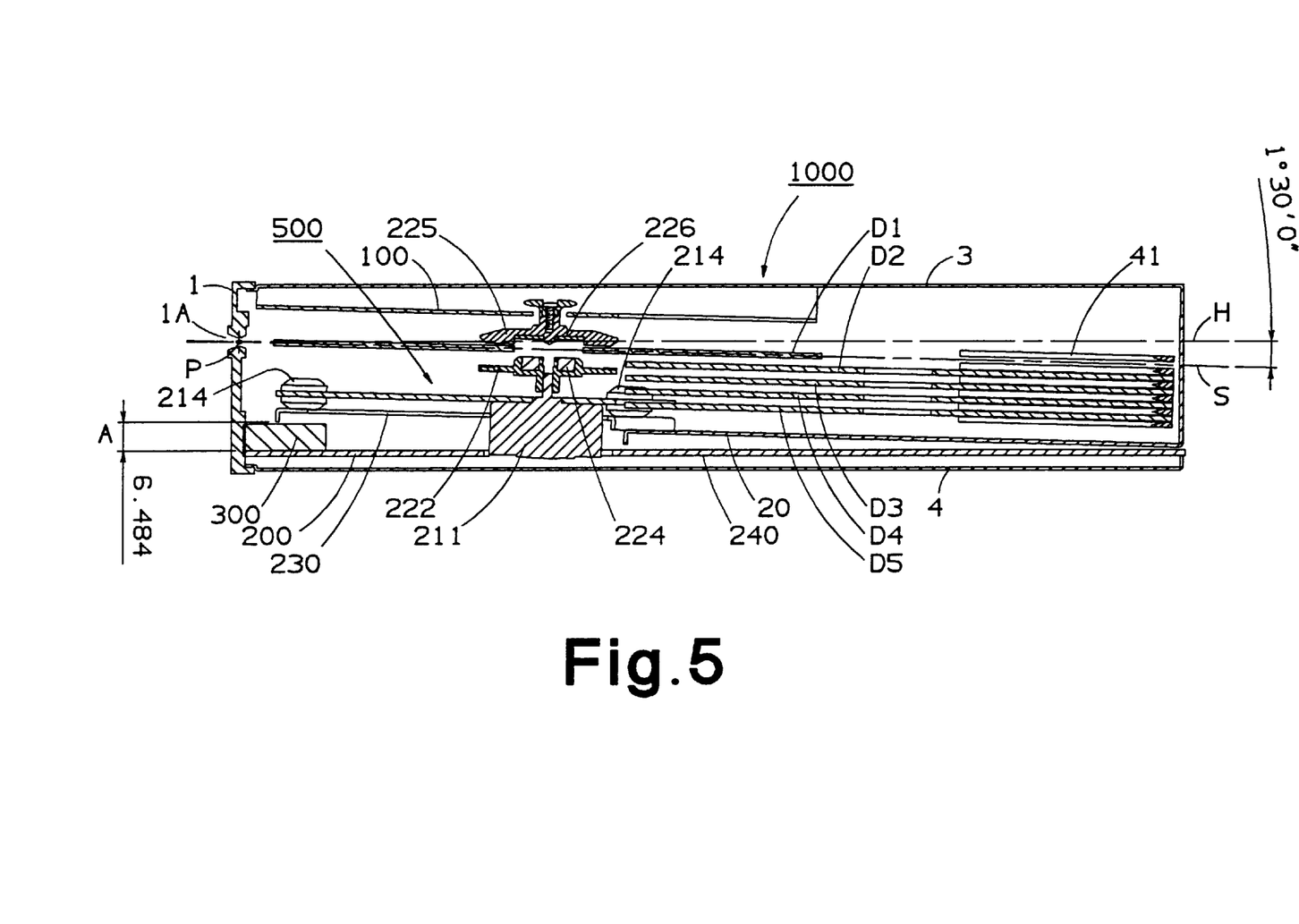
FIG. 5 is a cross-section drawing of changer-type disk playback device 1000 according to the present invention when disk D1 is brought to playback position P3.

Referring to FIG. 2, disk playback mechanism 500 is disposed below a disk D1 brought to playback position P3. Disk playback mechanism 500 is moveable vertically relative to disk transfer plane S. Disk playback mechanism 500 rotates the disk at the playback position, and an optical head 210 optically reads the data recorded on the lower surface of the disk. Turntable 222 is fixed to the rotation shaft of a spindle motor 211, and spindle motor 211 and optical head 210 are attached to a mechanism chassis 200. Mechanism chassis 200 is attached to a stainless steel base 230 via a damper 214 in order to prevent external vibrations from reaching turntable 225 and optical head 210. An optical mechanism vertical motion mechanism 400 moves stainless steel base 230 vertically between an up position for disk playback (FIG. 2) and a down position (FIG. 5). In the up position, the upper surface of turntable 222 is aligned with the lower surface of playback disk D. In the down position, turntable 222 is retracted below playback disk D1.

A printed circuit board 240 is attached along a bottom surface 4 of the device. Electronic parts 300, which are relatively elevated (approximately 6 mm), are attached near the back surface of device front panel 1. Electronic parts 300 can include a disk eject switch, a headphone terminal, a headphone volume control, and the like. As described above, disk transfer plane S is sloped at 1.5 degrees relative to a horizontal surface H of the device toward the bottom surface of the device. The slope is centered on a midpoint P of the height of disk insertion opening 1A, which remains unchanged. This prevents the gap between disk playback mechanism 500 and printed circuit board 240 from being too narrow. In particular, a gap A (FIG. 5), between disk playback mechanism and printed circuit board 240 near the back surface of the front panel, is almost as wide as a gap B (FIG. 7) of the conventional device. This prevents disk playback mechanism 500 from obstructing electronic parts 300. Printed circuit board 240 is also mounted with various circuit elements (not shown in the drawings) for controlling the operations of the different mechanisms (e.g., microprocessors and LSIs for performing signal processing of disk read signals). These circuit elements are much thinner than electronic parts 300 and will never engage disk playback mechanism 500.

A damper 225, disposed above disk D1 at playback position P3, clamps disk D1 onto turntable 222. Clamper 225 includes a magnetic plate 226 disposed on its lower surface. Magnetic plate 226 is attracted to a magnet 224 attached to a centering portion of turntable 222 to clamp the disk onto turntable 222.

Referring to FIGS. 5 and 6, when the disk is being transferred, the upper portion of damper 225 is supported on either side by damper holders 145 and 146 to keep the lower surface of damper 225 at an unclamped position 0.5 mm above the upper surface of the disk. Clamper holders 145 and 146 are attached to loading plate 100 so that they can move left and right. A spring 161 urges damper holders 145 and 146 toward each other. When a disk is about to be loaded through disk insertion opening 1A (FIG. 6), the distance between belts 107 and 142 is narrower than the disk diameter and damper holders 145 and 146 keep damper 225 at the unclamped position. When loading plates 104 and 140 are widened to the open position (FIG. 1) during playback and the like, damper holders 145 and 146 are spread apart by the loading plates and the support provided to damper 225 is disengaged. Disengaged damper 225 is drawn to magnet 224 attached to turntable 222, and the disk is fixed to turntable 222.

Stocker 41, located toward the rear of the device, is attached so that it can move up and down vertically relative to disk transfer plane S. Stocker 41 includes five slots parallel to disk transfer plane S, thereby allowing five disks to be stored coaxially, separated by a disk pitch of 3 mm. Since the thickness of a disk is 1.2 mm, the gap between adjacent disks is 1.8 mm. Even if the front end of a stored disk slopes downward because of looseness, playback disk D5 does not contact stored disk D4 stored directly above it. Stocker 41 is driven by a stocker vertical movement mechanism 800 to move vertically between a position where the uppermost slot is aligned with disk transfer plane S (FIG. 2), and a position where the lowermost slot is aligned with disk transfer plane S (FIG. 3).

The following is a description of the operations of this embodiment of the present invention. When no disk is present on disk transfer plane S, loading plates 104 and 140 are positioned by spring 160 at a disk receiving position (FIG. 6) spaced apart slightly less than a disk diameter. When disk D1 is inserted through disk insertion opening 1A, loading plates 104 and 140 are spread apart in opposition to spring 160 by the insertion force of disk D1. When this widening is detected by a switch (not shown), drive belt 107 is driven to rotate counterclockwise. Drive belt 107 transfers disk D1 clockwise while transferring it to playback position P3 (FIG. 4).

Figure 3:
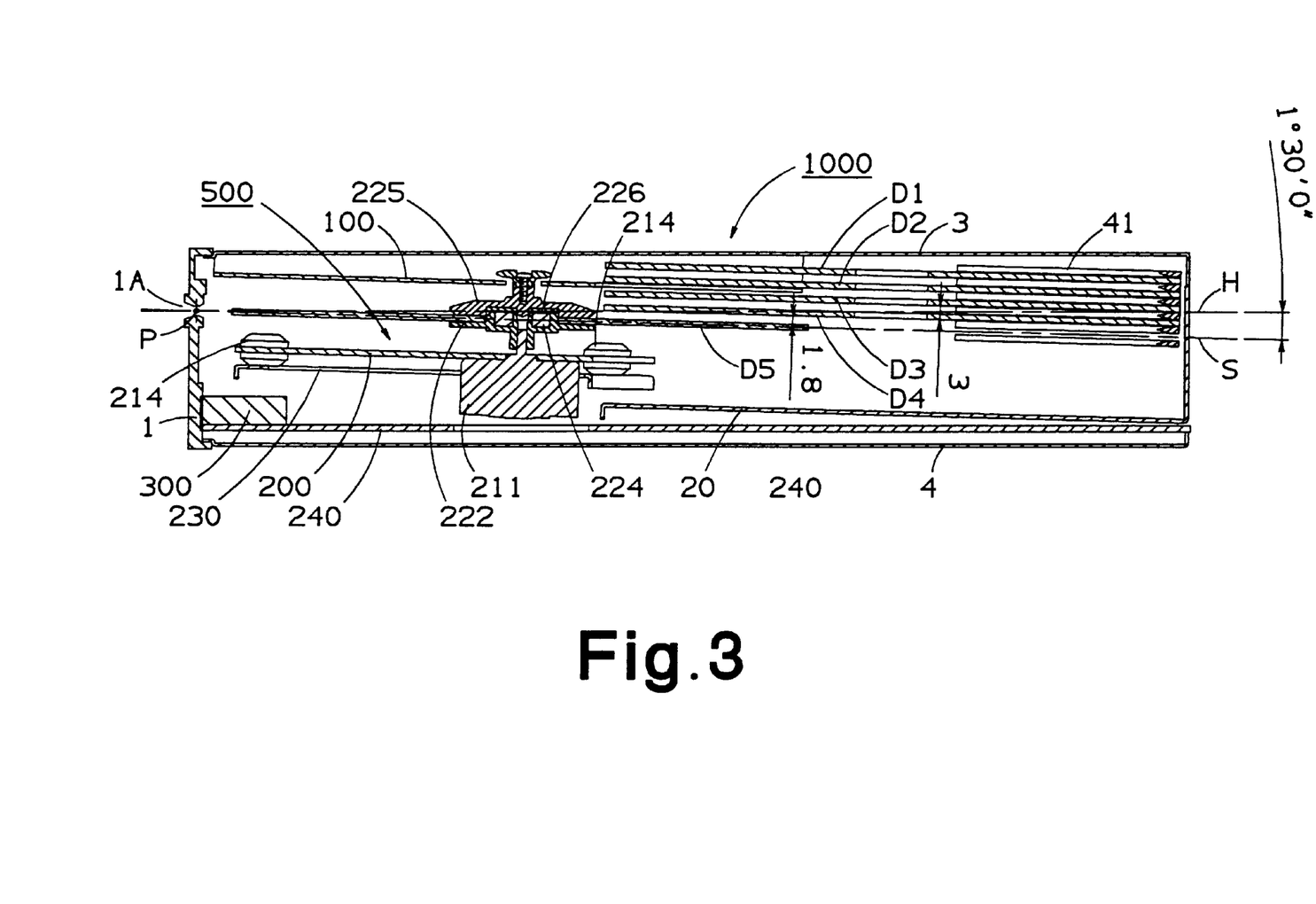
FIG. 3 is a cross-section drawing of changer-type disk playback device 1000 according to the present invention when it is playing back disk D5.

Once disk D1 is brought to the playback position, disk playback mechanism 500 is brought to the up position (FIG. 3). The centering portion of turntable 222 is inserted into the spindle hole of disk D1. The disk mounting surface is brought to a height where is precisely engages the lower surface of playback disk D1. Then, loading plates 104 and 140 are spread apart to the open position (FIG. 1), and belts 107 and 142 are moved away from the left and right side surfaces of the disk D1. While loading plates 104 and 140 are moved apart, clamp holders 145 and 146 are also spread apart to disengage the support on damper 225. Disengaged damper 225 is attracted to magnet 224 on turntable 222, and disk D1 is clamped between clamper 225 and turntable 222. Thus, disk D1 is mounted on turntable 222. Disk D1 is rotated by spindle motor 211, to permit optical head 210 to read data. The operations involved in ejecting disk D1 from disk insertion opening 1A are the reverse of the operations described above, so they will be omitted here.

The following is a description of the operations involved in replacing disk in D1, in playback position P3, with disk D2 held in stocker 41, and playing back disk D2. When disk D1 stops rotating, loading plates 104 and 140 are narrowed to the disk supporting position (FIG. 4), where disk D1 is supported between belts 107 and 142. At the same time, the spacing between damper holder 145 and 146 is narrowed. This lifts and supports the upper portion of damper 225 clear of disk D1. Then, disk playback mechanism 500 is brought to the down position (FIG. 5), to recess turntable 222 below disk D1. The counterclockwise rotation of drive belt 107 moves disk D1 into storage in the uppermost slot of stocker 41. Then, loading plates 104 and 140 are spread apart to the open position (FIG. 1), and belts 107 and 142 move away from the side surface of disk D1.

Then, stocker 41 rises 3 mm to align the second slot from the top, in which disk D2 is stored, with disk transfer plane S. Loading plates 104 and 140 are again narrowed, and disk D2 is supported between belts 107 and 142. Drive belt 107 is rotated clockwise, and disk D2 is brought to playback position P3 (FIG. 4). Disk playback mechanism 500 is brought to the up position (FIG. 3), and loading plates 104 and 140 are spread apart to the open position (FIG. 1). During the spreading apart of the loading plates, damper holders 145 and 146 are also spread apart, and the support on damper 225 is disengaged. These operations cause disk D2 to be mounted on turntable 222. Disk D2 is rotated by spindle motor 211, and data is read by optical head 210. The other operations are easily understood from the operations presented above, and so their descriptions will be omitted.

The present invention is not restricted to the embodiments described above, and various modifications can be made.

For example, in the embodiment above, a disk is transferred using belt 107 and 142. However, it would also be possible to transfer the disk by pushing the side surface of the disk using a rotatable arm or to use a pair of rollers to support the upper and lower surfaces of the disk. Also, a single disk transfer mechanism 600 is used to transfer the disk inserted from the disk insertion opening to either the playback position or the storing position. However, it would also be possible to have one mechanism transfer the disk from the insertion position (eject position) to the playback position, and to have another mechanism transfer the disk from the playback position to the storing position. Also, disk playback mechanism 500 is moved vertically relative to disk transfer plane S, but it would also be possible to have it brought to the up position by rotating it. Furthermore, the stocker is structured to hold five disks, but of course the stocker is not restricted to this number. The stocker may have a capacity of more or less than five disks. In addition, not all stored locations in the stocker need be filled.

The present invention as described above provides a changer-type disk playback device that can hold a greater number of disks without requiring a larger device. The disk transfer plane has a slope that is approximately centered at the midpoint of the height of the disk insertion opening so that, despite the increase in the number of stored disks, the space below the disk playback mechanism is not significantly narrower. This prevents the disk playback mechanism from interfering with elevated electronic parts that are disposed near the back surface of the device front panel, such as a disk eject switch, a headphone terminal, a headphone volume control, and the like.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A disk playback device comprising:
   a chassis having a front portion and a rear portion;
   a disk playback mechanism;
   a disk holder;
   a disk transfer mechanism;
   a vertical movement mechanism;
   said disk playback mechanism being disposed toward one of said front portion and said rear portion of said chassis;
   said disk holder being disposed toward the other of said front portion and said rear portion of said chassis;
   said disk transfer mechanism including a sloped disk transfer plane;
   said sloped disk transfer plane defines a reference plane in which a disk inserted into said device at said sloped disk transfer plane maintains parallelism with said sloped disk transfer plane at all times until extraction of said disk from said device
   said vertical movement mechanism is coupled to said disk holder for moving said disk holder in a direction perpendicular to said sloped disk transfer plane; and
   said sloped disk transfer plane having a slope from said front portion of said chassis to said rear portion for moving said disk from said disk playback mechanism to said disk holder,
   whereby additional space is available for disks stored in said disk holder.

2. A disk playback device as in claim 1, wherein said disk holder is a stocker for coaxially holding at least one disk.

3. A disk playback device as in claim 1, wherein said sloped disk transfer plane is approximately 1.5 degrees relative to a horizontal plane of said device.

4. A disk playback device as described in claim 1 wherein electronic parts are disposed substantially on a bottom surface of said chassis and below said disk playback mechanism, and said slope positions said sloped disk transfer plane as far as possible above said electronic parts, whereby additional vertical motion of said disk holder is enabled.

5. A disk playback device as in claim 1, wherein:
   said disk holder is a stocker for coaxially holding at least one disk; and
   said slope is approximately 1.5 degrees relative to a horizontal plane of said device.

6. A disk playback device as in claim 1, wherein:
   said disk holder is a stocker for coaxially holding at least one disk; and
   electronic parts are disposed substantially on a bottom surface of said chassis and below said disk playback mechanism, and said slope positions said sloped disk transfer plane as far as possible above said electronic parts, whereby additional vertical motion of said disk holder is enabled.

7. A disk playback device as in claim 1, wherein:
   said slope is approximately 1.5 degrees relative to a horizontal plane of said device; and
   electronic parts are disposed substantially on a bottom surface of said chassis and below said disk playback mechanism, and said slope positions said sloped disk transfer plane as far as possible above said electronic parts, whereby additional vertical motion of said disk holder is enabled.

8. A disk playback device as in claim 1, wherein:
   said disk holder is a stocker for coaxially holding at least one disk;
   said slope is approximately 1.5 degrees relative to a horizontal plane of said device; and
   electronic parts are disposed substantially on a bottom surface of said chassis and below said disk playback mechanism, and said slope positions said sloped disk transfer plane as far as possible above said electronic parts, whereby additional vertical motion of said disk holder is enabled.

9. A changer-type disk playback device comprising:
   a disk insertion opening in said disk playback device;
   a stocker disposed in said device capable of coaxially storing at least one disk;
   a disk transfer mechanism including a sloped disk transfer plane having a slope extending from a midpoint of said disk insertion opening toward said stocker;
   said sloped disk transfer plane defines a reference plane in which a disk inserted into said device at said sloped disk transfer plane maintains parallelism with said sloped disk transfer plane at all times until extraction of said disk from said device;
   said stocker retaining a disk therein parallel to said sloped disk transfer plane; and
   a stocker vertical movement mechanism selectively moveable in a direction perpendicular to said sloped disk transfer plane, for aligning a disk storage position in said stocker with said sloped disk transfer plane, whereby said disk transfer mechanism is capable of moving said disk inserted into said disk insertion opening to said disk storage position for storing said disk, said slope enabling storage of at least one additional disk in said stocker.

10. A changer-type disk playback device as described in claim 9, wherein said sloped disk transfer plane is sloped at approximately 1.5 degrees relative to a horizontal plane of said device.

11. A changer-type disk playback device as described in claim 9, further comprising a disk playback mechanism disposed inward of said disk insertion opening.

12. A changer-type disk playback device as described in claim 9, further comprising:

a disk playback mechanism disposed inward of said disk insertion opening; and electronic parts are disposed near an extremity of said disk playback device and below said disk playback mechanism, whereby said slope avoids interference between said disk playback mechanism and said electronic parts.

13. A changer-type disk playback device as described in claim 9, further comprising:

a disk playback mechanism disposed inward of said disk insertion opening:

said slope is approximately 1.5 degrees relative to a horizontal plane of said device;

electronic parts are disposed near an extremity of said disk playback device and below said disk playback mechanism; and said slope provides additional clearance above said electronic parts, whereby at least one additional disk may be accommodated in said stocker.

14. A method of transferring a disk in a playback device, the steps comprising:

loading a disk into said playback device along a sloped disk transfer plane in which said disk inserted into said device at said sloped disk transfer plane maintains parallelism with said sloped disk transfer plane at all times until extraction of said disk from said device;

moving a disk storage location into engagement with said sloped disk transfer plane between said playback device and said disk storage location with said disk storage location remaining parallel to said sloped disk transfer plane; and urging said disk from said playback device to said disk storage location.

* * * * *